(12) United States Patent
Kim et al.

(10) Patent No.: US 9,099,733 B2
(45) Date of Patent: Aug. 4, 2015

(54) SAFETY DEVICE FOR BATTERY PACK

(71) Applicant: LG CHEM, LTD., Seoul (KR)

(72) Inventors: TaeHyuck Kim, Daejeon (KR); Seungdon Choi, Daejeon (KR); Min Chul Jang, Daejeon (KR); Seung Taek Hong, Seoul (KR); Jin Kyu Lee, Daejeon (KR); DalMo Kang, Daejeon (KR); Seungsu Cho, Daejeon (KR); SeYon Hwang, Yangpyeong-gun (KR); SoulGie Hong, Seoul (KR)

(73) Assignee: LG CHEM, LTD., Seoul (KR)

( * ) Notice: Subject to any disclaimer, the term of this patent is extended or adjusted under 35 U.S.C. 154(b) by 48 days.

(21) Appl. No.: 14/062,352

(22) Filed: Oct. 24, 2013

(65) Prior Publication Data

US 2014/0050950 A1 Feb. 20, 2014

Related U.S. Application Data

(63) Continuation of application No. PCT/KR2012/004487, filed on Jun. 8, 2012.

(30) Foreign Application Priority Data

Jun. 8, 2011 (KR) .................. 10-2011-0054931

(51) Int. Cl.
*H01M 2/34* (2006.01)
*H01M 2/10* (2006.01)
*H01M 2/20* (2006.01)

(52) U.S. Cl.
CPC .............. *H01M 2/34* (2013.01); *H01M 2/1077* (2013.01); *H01M 2/20* (2013.01); *H01M 2/345* (2013.01);

(Continued)

(58) Field of Classification Search
CPC ..... H01M 2/345; H01M 2/347; H01M 2/348; H01M 2200/00; H01M 2200/20; H01M 2200/10
See application file for complete search history.

(56) References Cited

U.S. PATENT DOCUMENTS

| 2006/0083983 A1 | 4/2006 | Chang et al. |
| 2006/0159990 A1 | 7/2006 | Ryu et al. |

(Continued)

FOREIGN PATENT DOCUMENTS

| CN | 1989634 A | 6/2007 |
| CN | 101084592 A | 12/2007 |

(Continued)

OTHER PUBLICATIONS

International Search Report, issued in PCT/KR2012/004487, dated Nov. 12, 2012.

(Continued)

*Primary Examiner* — Muhammad Siddiquee
(74) *Attorney, Agent, or Firm* — Birch, Stewart, Kolasch & Birch, LLP

(57) ABSTRACT

Disclosed herein is a safety device mounted at one side of a battery pack including two or more battery cells or at least one battery module such that the safety device is first short-circuited when a needle type object penetrates the battery pack to secure safety of the battery pack, the safety device including a pair of conductive sheets spaced apart from each other, an electrically insulative housing to surround outsides of the conductive sheets excluding fronts of the conductive sheets in a state in which the conductive sheets are inserted and mounted in the housing, a sealing member to cover the fronts of the conductive sheets, and a connection member to connect the conductive sheets to a cathode and an anode of one of battery cells constituting the battery module.

16 Claims, 2 Drawing Sheets

(52) U.S. Cl.
CPC .......... *H01M 2/347* (2013.01); *H01M 2200/00* (2013.01); *H01M 2200/20* (2013.01); *H01M 2220/20* (2013.01)

(56) References Cited

U.S. PATENT DOCUMENTS

| | | | |
|---|---|---|---|
| 2006/0170394 A1* | 8/2006 | Ha et al. | 320/107 |
| 2008/0008927 A1 | 1/2008 | Lee et al. | |
| 2009/0208835 A1 | 8/2009 | Horiuchi et al. | |
| 2010/0159315 A1 | 6/2010 | Imasaka et al. | |
| 2010/0297482 A1 | 11/2010 | Yoon et al. | |
| 2011/0129709 A1 | 6/2011 | Ahn et al. | |
| 2011/0237139 A1* | 9/2011 | Lee et al. | 439/754 |
| 2012/0021265 A1 | 1/2012 | Takahashi | |
| 2012/0058382 A1* | 3/2012 | Carignan et al. | 429/158 |
| 2012/0114981 A1 | 5/2012 | Cho et al. | |

FOREIGN PATENT DOCUMENTS

| | | |
|---|---|---|
| CN | 101861666 A | 10/2010 |
| JP | 11-67279 A | 3/1999 |
| JP | 11-97066 A | 4/1999 |
| JP | 2001-68156 A | 3/2001 |
| JP | 2001-68161 A | 3/2001 |
| JP | 2001-297795 A | 10/2001 |
| JP | 2002-329493 A | 11/2002 |
| JP | 2006-527474 A | 11/2006 |
| JP | 2009-64630 A | 3/2009 |
| JP | 2009-87600 A | 4/2009 |
| JP | 2009-193815 A | 8/2009 |
| JP | 2009-543317 A | 12/2009 |
| JP | 2012-28089 A | 2/2012 |
| JP | 2012-182022 A | 9/2012 |
| JP | 2013-543644 A | 12/2013 |
| KR | 10-2006-0116678 A | 11/2006 |
| KR | 10-2009-0118197 A | 11/2009 |
| KR | 10-2010-0041442 A | 4/2010 |
| WO | WO 2007/023609 A1 | 3/2007 |

OTHER PUBLICATIONS

Chinese Office Action for Application No. 201280026227.2 dated Apr. 27, 2015 with English translation.

* cited by examiner

SAFETY DEVICE FOR BATTERY PACK

CROSS REFERENCE TO RELATED APPLICATIONS

This application is a Continuation of PCT International Application No. PCT/KR2012/004487 filed on Jun. 8, 2012, which claims priority under 35 U.S.C. §119(a) to Patent Application No. 10-2011-0054931 filed in the Republic of Korea on Jun. 8, 2011, all of which are hereby expressly incorporated by reference into the present application.

TECHNICAL FIELD

The present invention relates to a safety device for a battery pack and, more particularly, to a safety device mounted at one side of a battery pack including two or more battery cells or at least one battery module such that the safety device is first short-circuited when a needle type object penetrates the battery pack to secure safety of the battery pack, the safety device including a pair of conductive sheets spaced apart from each other, an electrically insulative housing to surround outsides of the conductive sheets excluding fronts of the conductive sheets in a state in which the conductive sheets are inserted and mounted in the housing, a sealing member to cover the fronts of the conductive sheets, and a connection member to connect the conductive sheets to a cathode and an anode of one of battery cells constituting the battery module.

BACKGROUND ART

As mobile devices have been increasingly developed and the demand for such mobile devices has increased, the demand for secondary batteries has sharply increased as an energy source for the mobile devices. Among such secondary batteries is a lithium secondary battery having high energy density and discharge voltage, into which much research has been carried out and which is now commercialized and widely used.

A secondary battery has attracted considerable attention as an energy source for power-driven devices, such as an electric bicycle (E-bike), an electric vehicle (EV), and a hybrid electric vehicle (HEV), as well as an energy source for mobile wireless electronic devices, such as a mobile phone, a digital camera, a personal digital assistant (PDA), and a laptop computer.

A small-sized battery pack, in which a battery cell is provided, is used for small-sized devices, such as a mobile phone and a digital camera. On the other hand, a middle or large-sized battery pack, in which a battery pack including two or more battery cells (hereinafter, occasionally referred to as a "multi-cell") connected to each other in parallel and/or in series is provided, is used for middle or large-sized devices, such as a laptop computer and an electric vehicle.

A lithium secondary battery exhibits excellent electrical properties as previously described; however, the lithium secondary battery has low safety. For example, when abnormal operations, such as overcharge, overdischarge, exposure to high temperature, and an electrical short circuit, of the lithium secondary battery occur, decomposition of active materials and an electrolyte, which are components of the battery, is caused with the result that heat and gas are generated and high-temperature and high-pressure conditions caused by generation of the heat and the gas accelerate the above-mentioned decomposition. Eventually, a fire or explosion may occur.

Safety issues of the lithium secondary battery are even more serious in a middle or large-sized battery pack having a multi-cell structure. Since a plurality of battery cells is used in the multi-cell battery pack, abnormal operation of some of the battery cells may cause abnormal operation of the other battery cells with the result that a fire or explosion may occur, which may lead to a large-scale accident. For this reason, the middle or large-sized battery pack is provided with a safety system, such as a fuse, a bimetal, and a battery management system (BMS), to protect the battery cells from overcharge, overdischarge, and overcurrent.

Meanwhile, as the lithium secondary battery is cycled in use, i.e. as the lithium secondary battery is repeatedly charged and discharged, a generating element and electrical connection members are gradually degraded. For example, degradation of the generating element leads to decomposition of electrode materials and the electrolyte, by which gas is generated. As a result, the battery cell (a container or a pouch-shaped case) gradually swells. In a normal state of the lithium secondary battery, the safety system, such as the BMS, detects overdischarge, overcharge, or overcurrent of the battery pack to control/protect the battery pack. If the BMS does not operate in an abnormal state of the lithium secondary battery, however, a possibility of danger in the battery pack is increased and control of the battery pack for safety is difficult. Since the middle or large-sized battery pack is configured to have a structure in which a plurality of battery cells is mounted in a predetermined case in a fixed state, the respective battery cells, when expanded, may be further pressed in the restricted case. Under abnormal operating conditions, therefore, a possibility of a fire or explosion is greatly increased.

Particularly, in a case in which the battery pack is used in a vehicle, strong external force sufficient to cause physical deformation of the battery pack may be applied to the battery pack or a needle type object may easily penetrate the battery pack due to collision of the vehicle. In this case, a short circuit between the battery cells may occur.

Therefore, there is a high necessity for technology that is capable of preventing abrupt flow of electric current and a fire or explosion of the battery due to a short circuit and more efficiently securing safety of the battery.

DISCLOSURE

Technical Problem

The present invention has been made to solve the above problems and other technical problems that have yet to be resolved.

It is an object of the present invention to provide a safety device mounted to one side of a battery pack such that the safety device is first short-circuited when external force sufficient to cause physical deformation of the battery pack is applied to the battery pack or a needle type object penetrates the battery pack, thereby securing safety of the battery pack.

It is another object of the present invention to provide a battery pack including such a safety device.

Technical Solution

In accordance with one aspect of the present invention, the above and other objects can be accomplished by the provision of a safety device mounted at one side of a battery pack including two or more battery cells or at least one battery module such that the safety device is first short-circuited when a needle type object penetrates the battery pack to secure safety of the battery pack, the safety device including a pair of conductive sheets spaced apart from each other, an electrically insulative housing to surround outsides of the conductive sheets excluding fronts of the conductive sheets in a state in which the conductive sheets are inserted and mounted in the housing, a sealing member to cover the fronts of the conductive sheets, and a connection member to connect the conductive sheets to a cathode and an anode of one of battery cells constituting the battery module.

As previously described, a secondary battery has a safety-related problem although the secondary battery exhibits excellent performance. For example, when a needle type object presses or penetrates the battery or strong external force sufficient to cause physical deformation of the battery is applied to the battery, a cathode and an anode of the battery contact each other with the result that a short circuit occurs. At this time, temperature of the battery abruptly increases due to reaction between electrode active materials. In particular, since a plurality of battery cells is used in the battery pack, abnormal operation of some of the battery cells may cause cascade failure of the other battery cells. Eventually, a fire or explosion may occur.

In a case in which the safety device according to the present invention is mounted to one side of the battery pack, on the other hand, electric current flows first in the conductive sheets, the resistance of which is relatively low, of the safety device when a needle type object penetrates the battery pack or strong external force sufficient to cause physical deformation of the battery pack is applied to the battery as described above. As a result, a short circuit of the safety device intentionally occurs and thus electric conduction of the safety device is achieved. Consequently, an amount of energy flowing between the battery cells is reduced, thereby preventing the occurrence of a fire or explosion.

In the safety device according to the present invention, each of the conductive sheets may be made of a metal material.

Kind of each of the conductive sheets is not particularly restricted. For example, each of the conductive sheets may be made of at least one selected from a group consisting of copper, aluminum, cobalt, chrome, iron, magnesium, manganese, molybdenum, and nickel or an alloy of two or more thereof.

In a preferred example, the housing may be provided at an inner upper end with a pair of grooves and at an inner lower end thereof with another pair of grooves such that the respective conductive sheets are inserted into the grooves in a state in which the conductive sheets are spaced apart from each other.

Specifically, a protrusion having a width equivalent to a distance between the grooves may be formed between the grooves such that the respective conductive sheets are mounted and fixed in the grooves in a state in which the conductive sheets are spaced apart from each other. The width of the protrusion may be equivalent to about 10 to 20% the height of each of the grooves.

The distance between the grooves may be changed depending upon design conditions. For example, the distance between the grooves may be 0.1 cm to 10 cm, preferably 0.5 cm to 5 cm. However, the distance between the grooves is not limited thereto.

Meanwhile, the sealing member may seal the open fronts of the conductive sheets to isolate the conductive sheets from the outside. Consequently, the sealing member may function to prevent introduction of foreign matter or moisture into the safety device while protecting the conductive sheets from external impact which cannot cause deterioration in safety of the battery pack.

For example, the sealing member may be formed to have a structure to seal the open fronts and a portion of opposite sides of the conductive sheets excluding side portions of the conductive sheets along which the connection member extends. The sealing member may be formed to have various structures. For example, the sealing member may be mounted to the housing in a sliding fashion. Alternatively, the sealing member may tightly contact the front of the housing in a state of being elastically deformed. Alternatively, the sealing member may be fixed to one side of the housing in a hinged fashion. Alternatively, the sealing member may be coupled to the housing through a predetermined fastening structure. The sealing member may be made of an insulative material like the housing. However, the material for the sealing member is not limited thereto.

Meanwhile, the connection member may have a length sufficient to electrically connect the conductive sheets to a cathode and an anode of the battery module.

The housing may be provided with a pair of grooves formed so as to correspond to connection positions between the connection member and the conductive sheets such that the connection member is mounted in the grooves. When vibration is generated, therefore, the connection member is prevented from being separated from the conductive sheets and the housing.

Meanwhile, the shape of the connection member is not particularly restricted so long as electrical connection between the connection member and the conductive sheets is easily achieved. For example, the connection member may be formed in a flat strip shape or a linear wire shape. Preferably, the connection member is formed in a flat strip shape.

In the safety device as described above, electric current flows first in the conductive sheets when a needle type object penetrates the battery pack or external force sufficient to cause physical deformation of the battery pack is applied to the battery pack. As a result, a short circuit of the safety device intentionally occurs. Consequently, an amount of energy flowing between the battery cells is reduced, thereby preventing the occurrence of a fire or explosion and thus improving safety of the battery pack.

The safety device according to the present invention may be electrically connected to the battery modules. Consequently, the battery pack may be designed based on desired output and capacity of the battery pack.

In accordance with another aspect of the present invention, there is provided a battery pack achieving electrical connection using the safety device.

In a preferred example, the battery pack may be configured to have a structure in which a plurality of battery modules, each of which has a cathode terminal and an anode terminal protruding from the same side thereof, is stacked. In a case in which the cathode terminal and the anode terminal are formed at the same side of each of the battery modules as described above, a space defined by protruding portions of the electrode terminals may be reduced as compared with a case in which the cathode terminal and the anode terminal are formed at different sides of each of the battery modules. Consequently, the battery pack may be configured to have a more compact structure.

In a preferred example, one of the battery modules facing the safety device may be provided with a weak portion configured to have a structure in which an electrode terminal connection region is ruptured such that electrical connection of the battery module is interrupted when battery cells expand.

As described above, the battery module may be configured to have a structure in which the electrode terminal connection region of the battery cell has low resistance to expansion in volume of the battery cell when the battery cell swells. When the swelling volume of the battery cell exceeds a predetermined critical value, therefore, expansion stress may be concentrated at the electrode terminal connection region such that the electrode terminal connection region is ruptured due to physical deformation thereof. Electrical connection in the battery module is interrupted due to such rupture of the electrode terminal connection region with the result that a charging and discharging process of the battery module is interrupted. Consequently, the increase in swelling volume of the battery cell or the unit module is restrained, thereby preventing the occurrence of a fire or explosion and thus greatly improving safety of the battery.

The weak portion may be formed at a cell cover of the battery module facing the safety device as a cutoff portion. For example, battery cells may be covered by a high-strength cell cover made of a synthetic resin or a metal material to constitute one battery module. A cutoff portion having a desired shape may be formed at a portion of the cell cover adjacent to the electrode terminal connection region such that expansion stress of the battery cells is concentrated at the cutoff portion of the cell cover when the battery cells swell.

The size of the cutoff portion may be changed depending upon rupture setting conditions of the electrode terminal connection region. For example, the size of the cutoff portion may be set such that the electrode terminal connection region is ruptured when volume of each battery cell exceeds two to five times a thickness of each battery cell due to swelling of each battery cell. Such a setting range may be changed according to safety test standards of a desired battery module. However, if the size of the cutoff portion is too large, mechanical rigidity of the battery cell due to the cell cover may be lowered and expansion of the battery cells may not be restrained under normal operating conditions. Therefore, it is necessary to set the size of the cutoff portion within an appropriate range in consideration of the above.

Meanwhile, the electrode terminals of the battery modules may be arranged on the same line, electrode terminal connection devices may be mounted to electrical connection regions between the electrode terminals, and the safety device may be mounted to the battery pack in a state in which the safety device is spaced from an outermost one of the battery modules by a predetermined distance.

In the above structure, the distance may be 1 cm to 20 cm, preferably 3 cm to 10 cm, more preferably 3 cm to 7 cm. If the distance is too small, it may be difficult to secure a swelling distance due to overcharge. On the other hand, if the distance is too large, the volume of the battery pack may be increased.

In accordance with a further aspect of the present invention, there is provided a vehicle including the battery pack as a power source.

In particular, the vehicle may be an electric vehicle, a hybrid electric vehicle, or a plug-in hybrid electric vehicle in consideration of installation efficiency and structural stability according to desired output and capacity thereof.

The structure of a general battery pack and the structure of a device including the battery pack are well known in the art to which the present invention pertains and, therefore, a detailed description thereof will be omitted.

DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
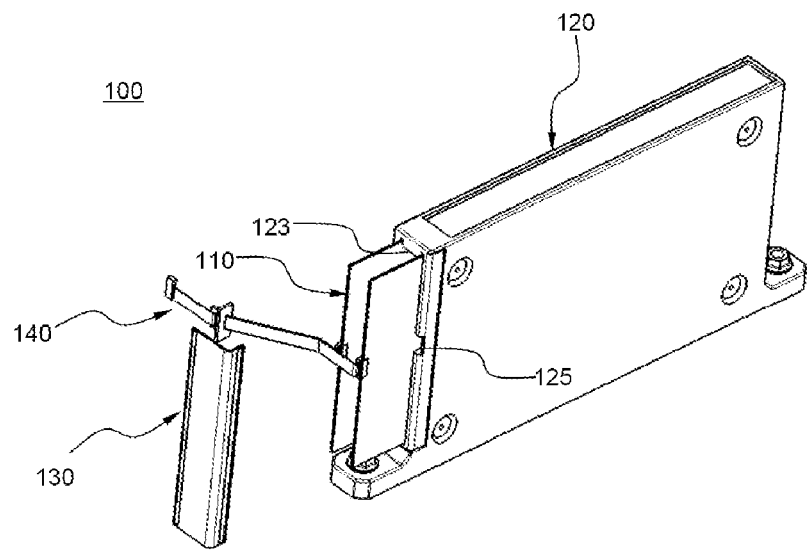
FIG. 1 is a perspective view showing a safety device according to an embodiment of the present invention.
Figure 2:
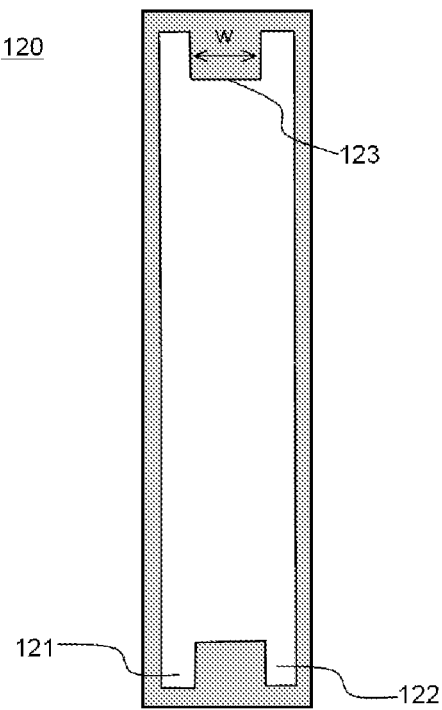
FIG. 2 is a front typical view showing a housing of FIG. 1.

FIG. 1 is a perspective view typically showing a safety device according to an embodiment of the present invention and FIG. 2 is a front typical view showing a housing of FIG. 1.

Referring to these drawings, a safety device 100 includes a pair of conductive sheets 110 made of copper, an electrically insulative housing 120 to surround outsides of the conductive sheets 110 excluding fronts of the conductive sheets 110 in a state in which the conductive sheets 110 are inserted and mounted in the housing 120, a sealing member 130 to cover the fronts of the conductive sheets 110; and a connection member 140 to connect the conductive sheets 110 to a cathode and an anode of one of battery cells of a battery module 200.

The housing 120 is provided at an inner upper end with a pair of grooves 121 and 122 and at an inner lower end thereof with another pair of grooves 121 and 122 such that the respective conductive sheets 110 are inserted into the grooves 121 and 122 in a state in which the conductive sheets 110 are spaced apart from each other.

In addition, a protrusion 123 having a width w equivalent to the distance between the grooves 121 and 122 is formed between the grooves 121 and 122 such that the respective conductive sheets 110 are mounted and fixed in the grooves 121 and 122 in a state in which the conductive sheets 110 are spaced apart from each other.

The sealing member 130 is made of an electrically insulative material. The sealing member 130 seals the open fronts and a portion of opposite sides of the conductive sheets 110 excluding side portions of the conductive sheets 110 along which the connection member 140 extends to have a shape of '┐' to isolate the conductive sheets 110 from the outside.

The connection member 140 has a length sufficient to electrically connect the conductive sheets 110 to the cathode and the anode of the battery module. The connection member 140 is formed in a flat strip shape.

Meanwhile, the housing 120 is provided with a pair of grooves 125 formed so as to correspond to connection positions between the connection member 140 and the conductive sheets 110 such that the connection member 140 is mounted in the grooves 125.

Figure 3:
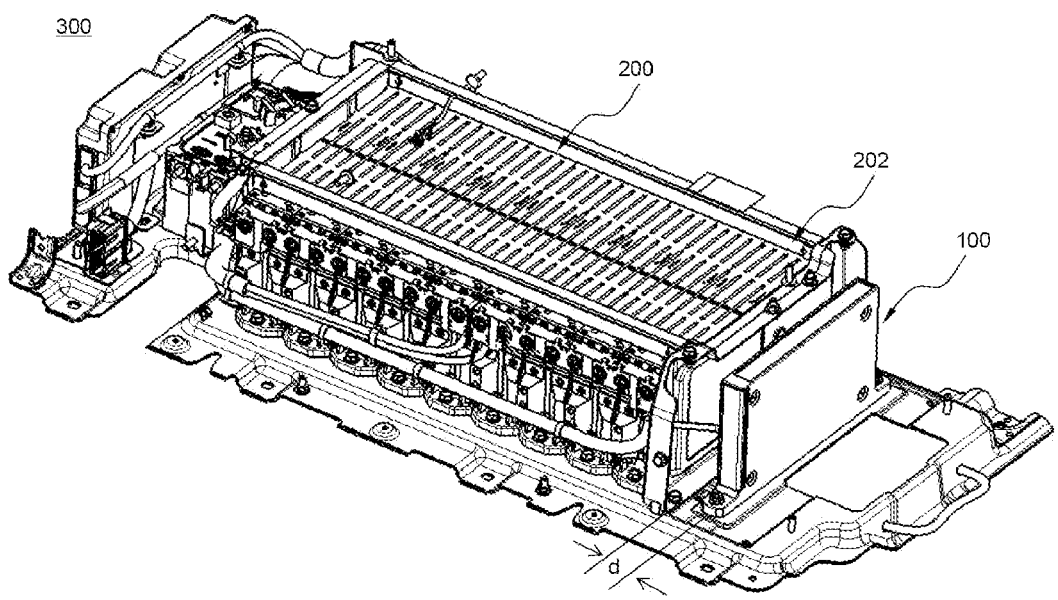
FIG. 3 is a perspective view showing a battery pack according to another embodiment of the present invention.
Figure 4:
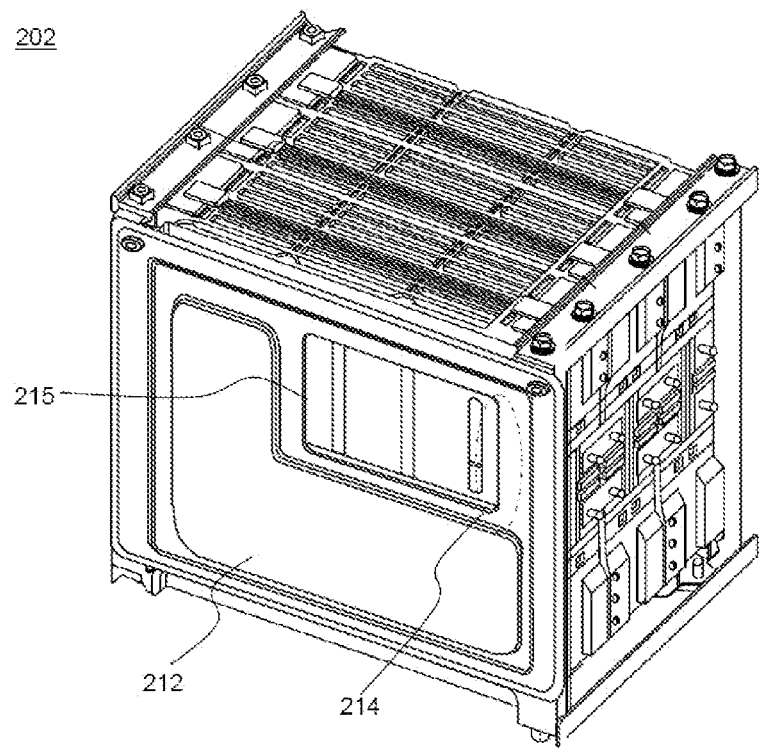
FIG. 4 is a perspective view showing a battery module of FIG. 3.

FIG. 3 is a perspective view typically showing a battery pack according to another embodiment of the present invention and FIG. 4 is a perspective view typically showing a battery module of FIG. 3.

Referring to these drawings together with FIG. 1, a battery pack 300 is configured to have a structure in which a plurality of battery modules 200, each of which has a cathode terminal and an anode terminal protruding from the same side thereof, is stacked. The electrode terminals of the respective battery modules 200 are located at one side of the battery pack 300. The safety device 100 is mounted to the battery pack 300 in a state in which the safety device 100 is spaced from an outermost battery module 202 by a distance d of about 5 cm.

FIG. 4 typically shows the battery module 202 of FIG. 3.

Referring to FIG. 4 together with FIGS. 1 to 3, the battery module 202 is configured to have a structure in which battery cells are surrounded by a cell cover. A cell cover 212 of the battery module 202 facing the safety device 100, which is one of the battery modules 200, is provided with a cutoff portion 215.

When a swelling thickness of each battery cell exceeds twice the thickness of each battery cell, therefore, an electrode terminal connection region 214 protrudes through the cutoff portion 215 with the result that the electrode terminal connection region 214 is ruptured. Consequently, electrical connection of the battery module 200 is interrupted.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a safety device according to the present invention is mounted to one side of a battery pack such that the safety device is first short-circuited when a needle type object penetrates the battery pack or strong external force sufficient to cause physical deformation of the battery pack is applied to the battery pack, thereby greatly improving safety of the battery pack.

The invention claimed is:

1. A safety device mounted at one side of a battery pack comprising two or more battery cells or at least one battery module such that the safety device is first short-circuited when a needle type object penetrates the battery pack to secure safety of the battery pack, the safety device comprising:
    a pair of conductive sheets spaced apart from each other;
    an electrically insulative housing to surround outsides of the conductive sheets excluding fronts of the conductive sheets in a state in which the conductive sheets are inserted and mounted in the housing;
    a sealing member to cover the fronts of the conductive sheets; and
    a connection member to connect the conductive sheets to a cathode and an anode of one of battery cells constituting the battery module,
    wherein the housing is provided at an inner upper end with a first pair of grooves and at an inner lower end with a second pair of grooves such that the respective conductive sheets are inserted into the grooves so that the conductive sheets are spaced apart from each other, and
    wherein a protrusion having a width equivalent to a distance between the grooves is formed between the grooves such that the respective conductive sheets are mounted and fixed in the grooves so that the conductive sheets are spaced apart from each other.

2. The safety device according to claim 1, wherein each of the conductive sheets is made of a metal material.

3. The safety device according to claim 2, wherein each of the conductive sheets is made of at least one selected from a group consisting of copper, aluminum, cobalt, chrome, iron, magnesium, manganese, molybdenum, and nickel or an alloy of two or more thereof.

4. The safety device according to claim 1, wherein the sealing member seals the open fronts of the conductive sheets to isolate the conductive sheets from outside.

5. The safety device according to claim 1, wherein the connection member has a length sufficient to electrically connect the conductive sheets to a cathode and an anode of the battery module.

6. The safety device according to claim 5, wherein the housing is provided with a pair of grooves formed so as to correspond to connection positions between the connection member and the conductive sheets such that the connection member is mounted in the grooves.

7. The safety device according to claim 1, wherein the connection member is formed in a flat strip shape or a linear wire shape.

8. A battery pack achieving electrical connection using a safety device according to claim 1.

9. The battery pack according to claim 8, wherein the battery pack is configured to have a structure in which a plurality of battery modules, each of which has a cathode terminal and an anode terminal protruding from the same side thereof, is stacked.

10. The battery pack according to claim 9, wherein one of the battery modules facing the safety device is provided with a weak portion configured to have a structure in which an electrode terminal connection region is ruptured such that electrical connection of the battery module is interrupted when battery cells expand.

11. The battery pack according to claim 10, wherein the weak portion is formed at a cell cover of the battery module facing the safety device as a cutoff portion.

12. The battery pack according to claim 11, wherein the cutoff portion has a size set such that the electrode terminal connection region is ruptured when volume of each battery cell exceeds two to five times a thickness of each battery cell due to swelling of each battery cell.

13. The battery pack according to claim 9, wherein electrode terminals of the battery modules are arranged on the same line, electrode terminal connection devices are mounted to electrical connection regions between the electrode terminals, and the safety device is mounted to the battery pack in a state in which the safety device is spaced from an outermost one of the battery modules by a predetermined distance.

14. The battery pack according to claim 13, wherein the distance is 1 cm to 20 cm.

15. A vehicle comprising a battery pack according to claim 8 as a power source.

16. The vehicle according to claim 15, wherein the vehicle is an electric vehicle, a hybrid electric vehicle, or a plug-in hybrid electric vehicle.

* * * * *